US010331559B2

(12) United States Patent
Klee et al.

(10) Patent No.: US 10,331,559 B2
(45) Date of Patent: Jun. 25, 2019

(54) INPUT/OUTPUT FILTER CONFIGURATION OF LINKED STORAGE

(71) Applicant: VMware, Inc., Palo Alto, CA (US)

(72) Inventors: Christoph Klee, Snoqualmie, WA (US); Adrian Drzewiecki, Mountain View, CA (US); Aman Nijhawan, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 478 days.

(21) Appl. No.: 14/838,200

(22) Filed: Aug. 27, 2015

(65) Prior Publication Data

US 2017/0060483 A1   Mar. 2, 2017

(51) Int. Cl.
*G06F 12/0802* (2016.01)
*G06F 9/50* (2006.01)
*G06F 3/06* (2006.01)

(52) U.S. Cl.
CPC .......... *G06F 12/0802* (2013.01); *G06F 3/061* (2013.01); *G06F 3/0659* (2013.01); *G06F 3/0683* (2013.01); *G06F 9/5077* (2013.01); *G06F 2212/1016* (2013.01); *G06F 2212/50* (2013.01)

(58) Field of Classification Search
CPC .. G06F 12/0802; G06F 3/0659; G06F 3/0683; G06F 9/5077; G06F 3/061; G06F 2212/50; G06F 2212/1016
See application file for complete search history.

(56) References Cited

U.S. PATENT DOCUMENTS

2014/0006731 A1\*  1/2014  Uluski ................ G06F 3/0604
                                                          711/155

\* cited by examiner

*Primary Examiner* — Michael Alsip
(74) *Attorney, Agent, or Firm* — Fish & Richardson P.C.

(57) ABSTRACT

Exemplary methods, apparatuses, and systems include a first input/output (I/O) filter receiving, from a first filter module within a virtualization stack of a host computer, an input/output (I/O) request originated by a virtual machine and directed to a first virtual disk. The first I/O filter determines to redirect the I/O request to a second virtual disk and, in response, forwards the I/O request to a second I/O filter associated with the second virtual disk. The first I/O filter is a part of a first instance of a filter framework within the host computer and the second I/O filter is part of a second, separate instance of the filter framework.

20 Claims, 2 Drawing Sheets

INPUT/OUTPUT FILTER CONFIGURATION OF LINKED STORAGE

FIELD OF THE INVENTION

The various embodiments described herein relate to configuring plug-in modules within a virtualization environment. In particular, embodiments relate to a virtual disk input/output (I/O) filter framework for providing linked storage.

BACKGROUND OF THE INVENTION

A virtual disk for a virtual machine (VM) may consist of a collection of files stored on an underlying file system. For example, the virtual disk may contain a metadata file, referred to herein as the "descriptor file," and at least one data file, referred to herein as the "extent file." The extent file stores virtual disk data, which is accessible to the VM. The descriptor file contains metadata accessible to the host's core virtualization stack for management of the extent file. For example, the descriptor file points to one or more extent files to indicate which extent files belong to the virtual disk and to provide the layout of a virtual disk. Additionally, the descriptor file may indicate the hierarchy for a virtual disk. For example, if the virtual disk is a linked clone of a base disk, the descriptor file may include a pointer to the base disk or otherwise include an indication that another disk is a parent or base disk for the linked clone.

Virtual disk I/O filters are plug-ins/pluggable code modules that, if applicable, modify intercepted VM I/O requests directed to corresponding virtual disks owned by the VMs. For example, an I/O filter may apply a policy to an intercepted I/O request before the data is read from or written to a disk. Exemplary I/O filter policies include inspection, compression, encryption, replication, and caching of I/O requests.

BRIEF DESCRIPTION OF THE DRAWINGS

The present invention is illustrated by way of an example and not limited to the figures and the accompanying drawings, in which like references indicate similar elements, and in which.

DETAILED DESCRIPTION

Embodiments described herein include virtual disk I/O filter framework for providing linked storage. In particular, embodiments include a filter module within a virtualization stack of a host computer intercepting an I/O request from a virtual machine and directed to a first virtual disk and forwarding the I/O request to a first I/O filter attached to the first virtual disk. The first I/O filter receives the I/O request, determines to redirect the I/O request to a second virtual disk and, in response, forwards the I/O request to a second I/O filter attached to the second virtual disk. The first I/O filter is a part of a first instance of a filter framework within the host computer and the second I/O filter is part of a second, separate instance of the filter framework. As a result, an I/O filter may be used to implement a linked clone, snapshot, or other linked hierarchy of disks without storing an indication of the linked disk or other disk hierarchy within the virtual disk. In one embodiment, this redirection is transparent to the guest operating system of the virtual machine. For example, from the perspective of the guest operating system of the virtual machine, the I/O request may appear to be completed by/using the first virtual disk. The configuration for redirection of I/O requests may be completely contained within the first I/O filter rather than including a pointer to the base disk, or other disk hierarchy, within the descriptor file. In one embodiment, this filter framework enables easier filter integration for the base virtual disk. For example, instead of having all I/O filters be aware of the full chain of a linked clones and the resulting complications (e.g., for a caching filter that needs to distinguish between reads to a particular linked clone virtual disk and reads to the base virtual disk), a different set of I/O filters may be attached to each of the virtual disks without consideration for the disk hierarchy. An encryption filter can be attached to the first virtual disk, while a caching filter can be attached to the second virtual disk, so that read requests redirected by an I/O filter to the base disk will be accelerated (for all VMs using the base virtual disk), while a VM's virtual disk can be independently encrypted. While examples in this description discuss a chain depth of two disks, embodiments may include chains of three disks or more. In another embodiment, multiple VMs can share a base disk that has an attached source filter to redirect I/O requests to external resources and an attached cache filter to accelerate access to the remote data via a cached copy of data. Remote data is sourced and cached in a manner that is transparent to the VMs.

Figure 1:
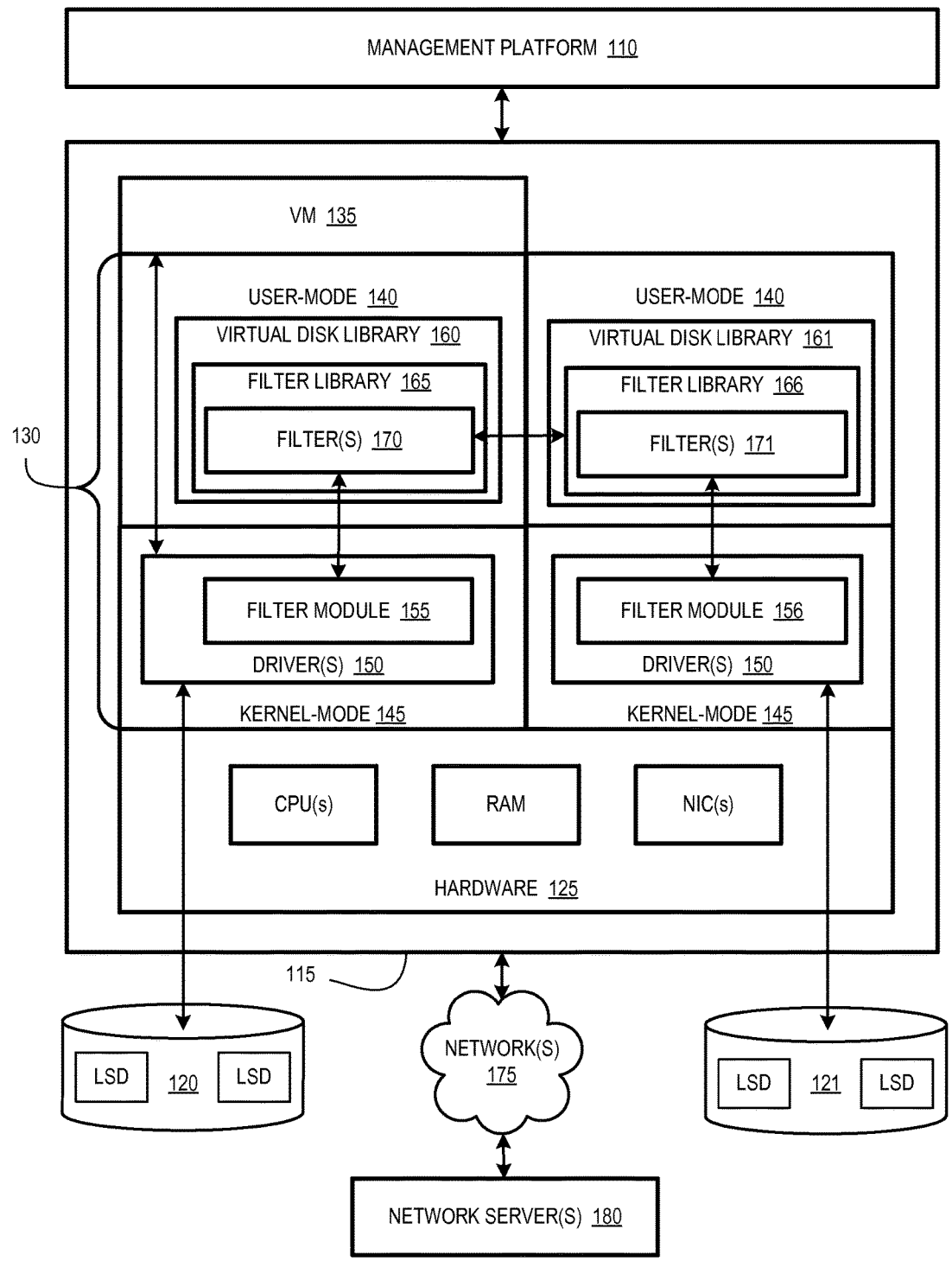
FIG. 1 illustrates, in block diagram form, an exemplary host computer including a virtual disk input/output (I/O) filter framework for providing linked storage.

FIG. 1 illustrates, in block diagram form, exemplary host computer 115 including a virtual disk I/O filter framework for providing linked storage. For example, host computer 115 may be a part of a data center that includes management platform 110, one or more host devices 115, and storage devices 120-121. Each host device 115 includes hardware 125, virtualization software layer 130 (also referred to as a hypervisor), and one or more virtual machines (VMs) 135.

VMs 135 are complete computation environments, containing virtual equivalents of the hardware and system software components of a physical system and are typically implemented by an extensive virtualization infrastructure, which includes a variety of software and hardware components. For example, one or more of VMs 135 may implement virtual desktops. A virtual desktop is a virtual computing system that operates as a desktop or workstation computer with which an end user can interact using a desktop remoting protocol over a network. In one embodiment, one or more of the VMs implement a virtualized networking, storage, or security service (e.g., a firewall, webserver, database server, etc.).

Virtualization software layer 130 runs on hardware 125 of host computer 115 and manages one or more VMs 135. Virtualization software layer 130 manages physical resources, e.g., hardware 125, as well as maintains virtual-to-physical hardware mappings. For example, virtualization software 130 may manage VM access to processor(s), memory, or network interface(s) within hardware 125 as well as one or more logical storage devices (e.g., virtual disks) within underlying storage 120-121.

Virtualization software layer 130 includes one or more virtual disk libraries 160-161, filter libraries 165-166, filter modules 155-156, and I/O filters 170-171. In the illustrated embodiment, each instance of this I/O filter framework is implemented across kernel and user-modes. As used herein, an application, driver, module, etc. running in kernel-mode 145 typically has unrestricted or minimally restricted access to virtual and/or physical resources (e.g., memory and processing resources). In contrast, an application, driver, module, etc. running in user-mode 140 has more restrictions on access to the virtual and/or physical resources (as compared to kernel-mode 145). For example, host computer 115 may run a driver in user-mode 140 to provide an intervening layer between the driver and the underlying resources. As a result, a poorly written device driver in user-mode 140 cannot crash the system by, e.g., erroneously overwriting kernel memory. Exemplary user-mode restrictions may prevent I/O filters 170-171 from doing one or more of the following: forking a new process, executing another executable, opening arbitrary files, etc. As a result, third parties that are typically not granted kernel-mode access may implement filters 170-171 as described herein. In an alternate embodiment, one or more of filter libraries 165-166 and/or filters 170-171 are implemented within kernel-mode 145.

Host device 115 includes one or more drivers 150 that run in kernel-mode 145. For example, drivers 150 may implement a storage management stack for virtualization software 130. I/O commands directed to a virtual disk that are initiated by a VM 135, management platform 110, or otherwise from an application, module, plug-in, etc., within user-mode 140 are passed to driver(s) 150 for translation and/or processing. Drivers 150 include one or more filter modules 155-156. Filter modules 155-156 intercept and redirect or otherwise process I/O requests in cooperation with filters 170-171 as described further with reference to FIG. 2.

Each virtual disk library 160-161 is a set of function calls used to manipulate virtual disk files. For example, virtual disk library 160 opens, closes, snapshots, clones, deletes, migrates, and otherwise manages virtual disks in storage 120 (e.g., in response to a command from management platform 110). In one embodiment, one or more virtual disk libraries 160-161 instantiate or otherwise configure (respectively) filter modules 155-156. For example, when virtual disk library 160 opens a virtual disk when powering on VM 135, virtual disk library 160 may configure filter module 155 to intercept I/O requests directed at the virtual disk. Intercepted I/O requests are passed to corresponding I/O filter(s) 170 via filter library 165. Additionally, in opening the virtual disk, virtual disk library 160 calls filter library 165 to load and initialize one or more filters 170 that have been attached to the virtual disk. For example, the virtual disk may include metadata that points to or otherwise identifies one or more I/O filters 170 attached to the virtual disk.

In one embodiment, each instance of the virtual disk library, including a corresponding filter library, is attached to or otherwise associated with an underlying virtual disk. Filter library 165 is loaded by virtual disk library 160 and manages one or more I/O filters 170 (and/or other plug-ins) in user-mode 140. Filter library 165 loads and maintains a list of loaded I/O filters 170 for one or more opened virtual disks within storage 120. Similarly, filter library 166 is loaded by virtual disk library 161 and manages one or more I/O filters 171 (and/or other plug-ins) in user-mode 140. Filter library 166 loads and maintains a list of loaded I/O filters 171 for one or more opened virtual disks within storage 121. In one embodiment, loading an I/O filter 170 in filter library 165 that redirects I/O requests to a secondary or base virtual disk causes the host computer to open the second virtual disk.

In one embodiment, each I/O filter registers a set of callbacks with its filter library. The callbacks pertain to different disk operations and enable I/O filters 170-171 to react to virtual disk events. For example, filter library 165 provides an application programming interface (API) for I/O filters 170 to receive intercepted I/O requests from filter module 155 in order to redirect or otherwise process the I/O requests as described further with reference to FIG. 2.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. The memory may be internal or distributed memory. One or more buses (not shown) may be used to interconnect the various components of hardware 125.

Management platform (e.g., as implemented by one or more servers) 110 is associated with host 115. Management platform 110 enables an administrator to manage the configuration of host computer 115 and corresponding virtualized data center environment. In one embodiment, management platform 110 provides a management console for manual and automated control of host computers 115, VMs 135, and hardware 125. For example, management platform 110 may provision, configure, and maintain VMs 135 as virtual desktops or network services, manage pools of computer resources to run VMs 135, etc. In one embodiment, an administrator configures I/O filter(s) 170-171 and corresponding policies using management platform 110.

Each of storage 120 and storage 121 includes one or more physical storage devices. In one embodiment, storage 120 and storage 121 include storage controllers (not illustrated) to serve read and write requests and management commands/queries from host devices 115 and management platform 110. Each of storage 120 and storage 121 is partitioned into logical units, volumes, virtual volumes, and/or virtual disks (which are collectively referred to herein logical storage devices) that are stored on one or more of the physical storage devices. For example, storage 120 is illustrated as including logical storage devices (LSD), one of which may serve as a virtual disk for VM 135. Storage 121 is also illustrated as including logical storage devices that may serve as virtual disks that may be linked to a VM, via an I/O filter 170, as described further with reference to FIG. 2. Storage 120 and storage 121 may combined within a single storage device or each include additional arrays, logical storage devices, or other partitions of storage.

In one embodiment, a virtual disk includes a descriptor file and one or more extent files. A descriptor file includes metadata used by the virtualization stack to manage the first virtual disk. For example, the descriptor file points to or otherwise identifies the one or more extent files that store virtual disk data. In one embodiment, the descriptor file points to or otherwise identifies one or more I/O filters attached to the virtual disk.

Figure 2:
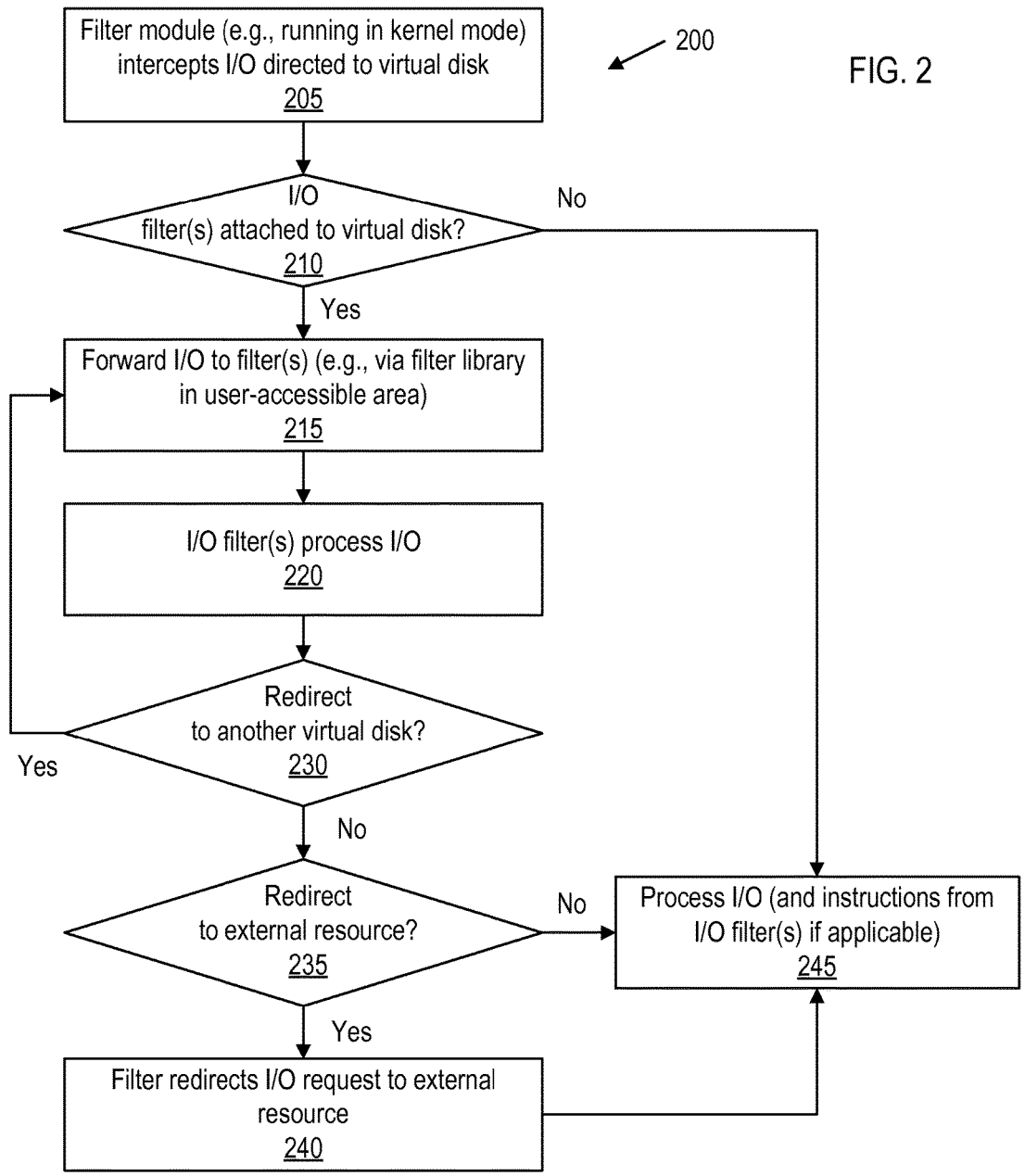
FIG. 2 is a flow chart illustrating an exemplary method of a host computer providing linked storage via a virtual disk I/O filter framework.

FIG. 2 is a flow chart illustrating exemplary method 200 of a host computer providing linked storage via a virtual disk I/O filter framework. At block 205, a filter module intercepts an I/O request directed to a virtual disk. For example, a filter module operates in an I/O path between a VM or other data compute node running on the host computer and a storage device including a virtual disk or other logical storage device. In one embodiment, the virtual disk stores metadata used by the host computer (e.g., a virtualization stack for the VM) to manage the virtual disk. When the host computer opens the virtual disk during the powering on of the VM, the host computer (e.g., using the virtual disk library) configures the filter module to intercept I/O requests directed at the virtual disk.

At block 210, the host computer determines if any I/O filters are attached to the virtual disk that is the target of the intercepted I/O request. For example, the metadata stored on the virtual disk may include a pointer or other indication of one or more I/O filters attached to the virtual disk. When the host computer opens the virtual disk during the powering on of the VM, the host computer detects one or more attached I/O filters and calls filter library to load and initialize the one or more I/O filters.

In an alternate embodiment, the filter module is included within the I/O path to a virtual disk only when one or more filters are attached to the virtual disk. As a result, the determination in block 210 would be unnecessary or optional and method 200 would proceed directly to block 215.

If one or I/O filters are attached to the virtual disk, at block 215, the filter module forwards the intercepted I/O request to the I/O filter(s). In one embodiment, the filter module runs in kernel mode and I/O filters are plug-ins running in user-mode. As a result, the I/O request originates in user-mode in a VM or other data compute node, is intercepted in kernel-mode by the filter module when in route to a virtual disk, and forwarded back to user-mode to one or more I/O filters. In such an embodiment, third-party I/O filters are implemented as plug-ins that run under the protections of user-mode while benefiting from a kernel-mode interception of an I/O request such that the interception and filter processing is transparent to the VM.

At block 220, the I/O filter(s) process the I/O request. In one embodiment, an I/O filter links the VM to a base disk. As a result of such an embodiment, the VM's virtual disk does need not store (and, therefore, excludes) a link to, pointer to, or other indication of hierarchy with respect to the base virtual disk. Instead, the I/O filter implements and keeps track of the linked clone or other linked disk hierarchy. For example, the I/O filter implements a snapshot, linked clone, or other linked disk configuration such that the VM reads unmodified data from a base virtual disk and writes to the VM's virtual disk (linked clone, snapshot, etc.). Additionally, the I/O filter may track data modified by VM write requests (and written to the VM's virtual disk) in order to direct I/O requests for the modified data to the VM's virtual disk rather than the base disk.

For example, referring back to FIG. 1, powering on VM 135 may include opening a virtual disk (LSD) within storage 120. An I/O filter attached to the virtual disk may implement a linked clone such that read requests for unchanged data are redirected by the I/O filter from the VM's virtual disk within storage 120 to a base virtual disk (LSD) within storage 121. In one embodiment, loading the I/O filter causes the host computer to open the base virtual disk as a read-only disk. As a result, multiple VMs may utilize the based virtual disk as a common data source via redirected I/O requests to the read-only base virtual disk.

In another embodiment, the I/O filter redirects both read and write requests from the VM's virtual disk to another virtual disk. For example, a virtual disk within storage 120 by be a read-only, thinly provisioned disk that is opened to run VM 135 but all I/O read and write requests from VM 135 are redirected to another virtual disk, e.g., on storage 121. In such an embodiment, multiple VMs may share a common virtual disk as a data source.

In one embodiment, the redirection of an I/O request may be implemented by the I/O filter forwarding the I/O request to another filter library instance. For example, filter 170 may forward an I/O request to filter library 166, e.g., via a NIC within hardware 125 and network(s) 175. In one embodiment, the redirection of the I/O request includes an I/O filter instructing a filter module to redirect the I/O request to a network server 180 or other external resource. In such an embodiment, the I/O filter translates particular blocks or other portions of the I/O request that identify a virtual disk targeted by the I/O request into one or more external resources. For example, the I/O filter may modify the I/O request to include an identifier of a filter 171 or a second virtual disk (LSD) within storage 121.

I/O filters may also implement one or more of I/O inspection, compression, encryption, replication, and caching of I/O requests. In one embodiment, the filter library implements an ordered application of multiple I/O filters. For example, a first I/O filter may cause the redirection of an I/O request to read data from an external source while a second I/O filter causes the result to be cached locally. In one embodiment, the caching filter is executed prior to the redirection filter and, in the case of a cache miss, the redirection filter will fetch the data from a remote location. For example, the caching filter may register a call back with the redirection filter such that, once the redirection filter has processed the I/O request, the result is returned to the caching filter to be cached. As another example, a first I/O filter may redirect read requests to a base disk while a second I/O filter encrypts the data of a write request before committing the encrypted data to a linked clone virtual disk. Additionally, I/O filters may be applied selectively based upon the content of the I/O request, the type of I/O request (e.g., read vs. write), the block or other portion of a virtual disk that is the target of the I/O request, whether or not the block or other portion of the virtual disk includes data modified from an original base disk version of the data, etc.

At block 230, the host computer, using an I/O filter, determines whether or not to redirect the I/O request to another virtual disk. As described above, this determination may be based upon the content of the I/O request, the type of I/O request (e.g., read vs. write), the block or other portion of a virtual disk that is the target of the I/O request, whether or not the block or other portion of the virtual disk includes data modified from an original base disk version of the data, etc. For example, an I/O filter may determine if an I/O request is directed to reading a portion of a linked clone virtual disk that has been written to replace data as stored in the base virtual disk. If the portion of the linked clone virtual disk has been written, the I/O request is directed to the underlying virtual disk as originally targeted in the I/O request. If the portion of the linked clone virtual disk has not been written, the I/O filter redirects the I/O request to the base virtual disk. In one embodiment, the I/O filter modifies the I/O request to include an identifier of another filter or the other virtual disk as a target for the I/O request and forwards the I/O request as modified to another instance of the filter library.

In one embodiment, the filter module is within the redirection path of the I/O request. For example, the filter module receives the I/O request from the I/O filter (after the I/O filter has processed the I/O request) and the filter module redirects the I/O request as modified by the I/O filter or otherwise as instructed by the I/O filter.

Once redirected, method 200 returns to block 215 for the corresponding second I/O filter to process the redirected I/O request. For example, an I/O request redirected to another virtual disk (via the separate filter library) may be subject to a set of one or more I/O filters attached to the other virtual disk. Referring again to FIG. 1, a filter 170 may redirect an I/O request (or portion thereof) that originated with VM 135 from an original target of a clone virtual disk within storage 120 to a base virtual disk within storage 121. The redirected I/O request is forwarded to one or more filters 171 attached to the base virtual disk. Filter(s) 171 may redirect the I/O request to an external source, encrypt the data within the I/O request, cache the I/O request or response form the external source, etc.

If the host computer determines, using I/O filter library, not to redirect the I/O request to another virtual disk, at block 235, the host computer optionally determines whether or not to redirect the I/O request to an external resource. For example, a source I/O filter may map I/O requests targeted to particular portions of a virtual disk to an external resource, such as one or more networked servers 180. In one embodiment, the I/O filter determines if the I/O request is directed to data that is cached locally. In the case of a cache miss, the I/O filter redirects the I/O request to the external resource.

If the host computer determines to redirect the I/O request to an external resource, at block 240, the corresponding I/O filter forwards the request. For example, the I/O filter redirects the I/O request via a NIC and network(s) 175 to external server 180. In one embodiment, in redirecting the I/O request, the I/O filter reformats the I/O request, e.g., according to a networking protocol.

In one embodiment, an I/O filter divides the I/O request into multiple portions, each of which may be processed separately. For example, one or more portions may be redirected to another virtual disk or external server while one or more other portions may be forwarded to the underlying virtual disk originally targeted by the I/O request.

At block 245, the filter module otherwise processes the I/O request. If the there is no I/O filter attached to the virtual disk, the filter module forwards the I/O request to the virtual disk (e.g., as originally targeted). If one or more I/O filters are attached to the virtual disk, but the I/O request is not redirected, the filter module processes the I/O request as modified by or according to the instruction from the I/O filter. For example, the filter module may write data from the I/O request to a virtual disk after an I/O filter encrypts the data. If the I/O request was redirected to an external resource, the filter module may process the response from the external resource to, e.g., return read data to the VM, cache a copy of data returned from the external resource, etc.

It will be apparent from this description that aspects of the inventions may be embodied, at least in part, in software. That is, the computer-implemented method 200 may be carried out in a computer system or other data processing system, such as hosts 115, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a host 115. It will also be appreciated that additional components, not shown, may also be part of hosts 115, and, in certain embodiments, fewer components than that shown in FIG. 1 may also be used in host 115.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories static, dynamic, or other), optical disks, CD-ROMs, DVD-ROMs, EPROMs, EEPROMs, magnetic or optical cards, solid state drives (SSD), or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention(s) have been described with reference to specific exemplary embodiments thereof. Various embodiments and aspects of the invention (s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
    intercepting an input/output (I/O) request at a first filter module within a virtualization stack of a host computer, wherein the I/O request is intercepted from a first virtual machine and directed to a first virtual disk of a plurality of virtual disks;
    determining a first I/O filter, of a plurality of I/O filters, that is attached to the first virtual disk, wherein the determining that the first I/O filter is attached to the first virtual disk is based on metadata of the first virtual disk identifying one or more attached I/O filters;
    in response to the determining, forwarding the I/O request to the first I/O filter;
    determining, by the first I/O filter, and based on the type of I/O request, to redirect the I/O request from the first virtual disk to a second virtual disk; and
    forwarding, by the first I/O filter module in response to the determination to redirect the I/O request based on the type of I/O request, the I/O request to a second I/O filter associated with the second virtual disk, wherein the first I/O filter is a part of a first instance of a filter framework within the host computer and the second I/O filter is part of a second, separate instance of the filter framework.

2. The computer-implemented method of claim 1, wherein the second virtual disk is a base disk, the first virtual disk is a linked clone of the base disk, and the linked clone is linked to the base disk through attaching the first I/O filter to the first virtual disk.

3. The computer-implemented method of claim 2, wherein the I/O request is redirected by the first I/O filter in response to the first I/O filter determining that the I/O request is a request to read data stored on the base disk, and wherein the first I/O filter module forwards write requests from the virtual machine to the first virtual disk.

4. The computer-implemented method of claim 3, wherein the write requests from the virtual machine are forwarded to a third I/O filter prior to being forwarded to the first virtual disk, wherein the third I/O filter is a part of the first instance of a filter framework.

5. The computer-implemented method of claim 1, wherein the first virtual disk includes metadata used by the virtualization stack to manage the first virtual disk, the method further comprising;
    detecting, by the first filter module, an indication, within the metadata, of at least one I/O filter attached to the first virtual disk; and
    forwarding, by the first filter module, the I/O request to the first I/O filter in response to detecting the indication of the at least one I/O filter in the metadata.

6. The computer-implemented method of claim 1, further comprising:
    determining, by the second I/O filter to redirect the I/O request to a resource external to the host computer; and
    forwarding, by the second I/O filter, the I/O request to the external resource.

7. The computer-implemented method of claim 6, further comprising:
    receiving, by the second I/O filter, data from the external resource in response to the forwarded I/O request; and
    caching, by a third I/O filter within the second instance of the filter framework, the data received from the external resource within the second virtual disk.

8. A non-transitory computer-readable medium storing instructions, which when executed by a processing device, cause the processing device to perform a method comprising:
    intercepting an input/output (I/O) request at a first filter module within a virtualization stack of a host computer, wherein the I/O request is intercepted from a first virtual machine and directed to a first virtual disk of a plurality of virtual disks;
    determining a first I/O filter, of a plurality of I/O filters, that is attached to the first virtual disk, wherein the determining that the first I/O filter is attached to the first virtual disk is based on metadata of the first virtual disk identifying one or more attached I/O filters;
    in response to the determining, forwarding the I/O request to the first I/O filter;
    determining, by the first I/O filter, and based on the type of I/O request, to redirect the I/O request from the first virtual disk to a second virtual disk; and
    forwarding, by the first I/O filter module in response to the determination to redirect the I/O request based on the type of I/O request, the I/O request to a second I/O filter associated with the second virtual disk, wherein the first I/O filter is a part of a first instance of a filter framework within the host computer and the second I/O filter is part of a second, separate instance of the filter framework.

9. The non-transitory computer-readable medium of claim 8, wherein the second virtual disk is a base disk, the first virtual disk is a linked clone of the base disk, and the linked clone is linked to the base disk through attaching the first I/O filter to the first virtual disk.

10. The non-transitory computer-readable medium of claim 9, wherein the I/O request is redirected by the first I/O filter in response to the first I/O filter determining that the I/O request is a request to read data stored on the base disk, and wherein the first I/O filter module forwards write requests from the virtual machine to the first virtual disk.

11. The non-transitory computer-readable medium of claim 10, wherein the write requests from the virtual machine are forwarded to a third I/O filter prior to being forwarded to the first virtual disk, wherein the third I/O filter is a part of the first instance of a filter framework.

12. The non-transitory computer-readable medium of claim 8, the method further comprising:
intercepting, by the first filter module, the I/O request, wherein the first virtual disk includes metadata used by the virtualization stack to manage the first virtual disk;
detecting, by the first filter module, an indication, within the metadata, of at least one I/O filter attached to the first virtual disk; and
forwarding, by the first filter module, the I/O request to the first I/O filter in response to detecting the indication of the at least one I/O filter in the metadata.

13. The non-transitory computer-readable medium of claim 12, the method further comprising:
determining, by the second I/O filter to redirect the I/O request to a resource external to the host computer; and
forwarding, by the second I/O filter, the I/O request to the external resource.

14. The non-transitory computer-readable medium of claim 13, the method further comprising:
receiving, by the second I/O filter, data from the external resource in response to the forwarded I/O request; and
caching, by a third I/O filter within the second instance of the filter framework, the data received from the external resource within the second virtual disk.

15. A host computer comprising:
a processing device; and
a memory coupled to the processing device, the memory storing instructions which, when executed by the processing device, cause the host computer to:
intercept an input/output (I/O) request at a first filter module within a virtualization stack of the host computer, wherein the I/O request is intercepted from a first virtual machine and directed to a first virtual disk of a plurality of virtual disks;
determine a first I/O filter, of a plurality of I/O filters, that is attached to the first virtual disk, wherein the determining that the first I/O filter is attached to the first virtual disk is based on metadata of the first virtual disk identifying one or more attached I/O filters;
in response to the determining, forward the I/O request to the first I/O filter;
determine, by the first I/O filter, and based on the type of I/O request, to redirect the I/O request from the first virtual disk to a second virtual disk; and
forward, by the first I/O filter module in response to the determination to redirect the I/O request based on the type of I/O request, the I/O request to a second I/O filter associated with the second virtual disk, wherein the first I/O filter is a part of a first instance of a filter framework within the host computer and the second I/O filter is part of a second, separate instance of the filter framework.

16. The host computer of claim 15, wherein the second virtual disk is a base disk, the first virtual disk is a linked clone of the base disk, and the linked clone is linked to the base disk through attaching the first I/O filter to the first virtual disk.

17. The host computer of claim 16, wherein the I/O request is redirected by the first I/O filter in response to the first I/O filter determining that the I/O request is a request to read data stored on the base disk, and wherein the first I/O filter module forwards write requests from the virtual machine to the first virtual disk.

18. The host computer of claim 17, wherein the write requests from the virtual machine are forwarded to a third I/O filter prior to being forwarded to the first virtual disk, wherein the third I/O filter is a part of the first instance of a filter framework.

19. The host computer of claim 15, wherein the instructions further cause the host computer to:
intercept, by the first filter module, the I/O request, wherein the first virtual disk includes metadata used by the virtualization stack to manage the first virtual disk;
detect, by the first filter module, an indication, within the metadata, of at least one I/O filter attached to the first virtual disk; and
forward, by the first filter module, the I/O request to the first I/O filter in response to detecting the indication of the at least one I/O filter in the metadata.

20. The host computer of claim 19, wherein the instructions further cause the host computer to:
determine, by the second I/O filter to redirect the I/O request to a resource external to the host computer; and
forward, by the second I/O filter, the I/O request to the external resource.

* * * * *